Figure 1:
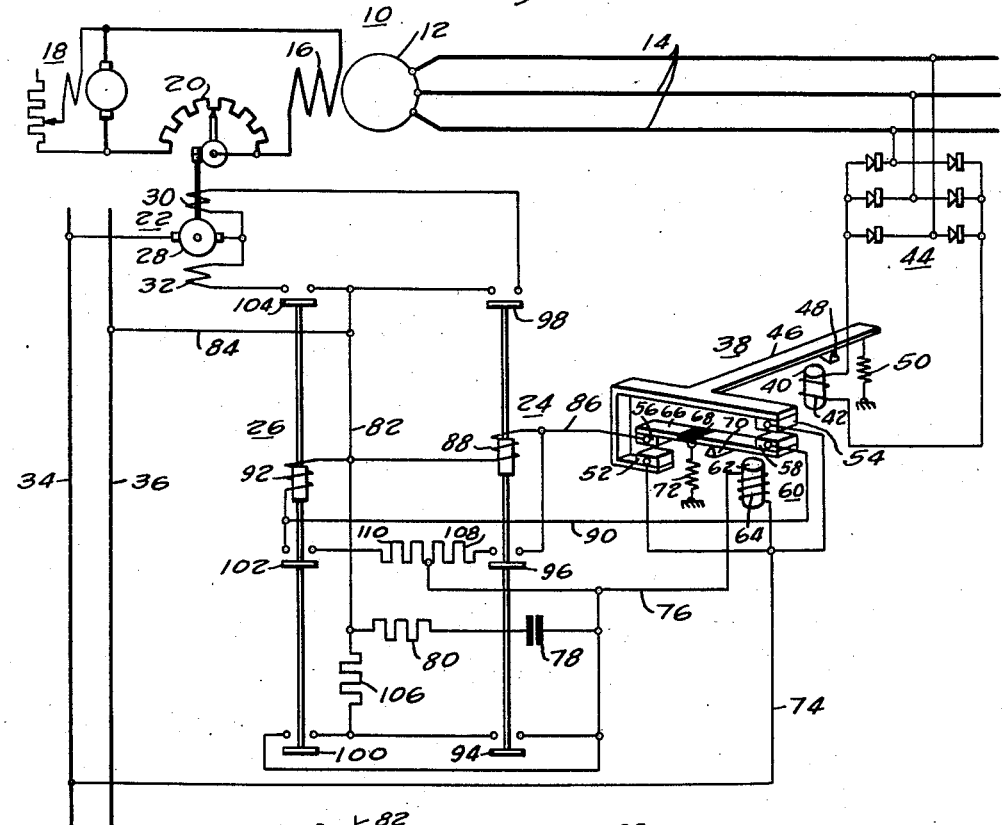

May 22, 1945.   J. F. KOVALSKY   2,376,784
TIME DELAY RELAY SYSTEM
Filed Aug. 26, 1942

WITNESSES:

INVENTOR
Joseph F. Kovalsky.
BY
ATTORNEY

Patented May 22, 1945

2,376,784

UNITED STATES PATENT OFFICE 2,376,784

TIME DELAY RELAY SYSTEM

Joseph F. Kovalsky, Turtle Creek, Pa., assignor to Westinghouse Electric & Manufacturing Company, East Pittsburgh, Pa., a corporation of Pennsylvania Application August 26, 1942, Serial No. 456,189

5 Claims. (Cl. 175—320)

This invention relates to regulator systems, and more particularly to regulator systems of the type employing a contact-making control element.

In regulators of the rheostat type which utilize cooperating primary and secondary relays for establishing a circuit to control the operation of a rheostatic motor and in which the secondary relay is actuated in a predetermined manner to interrupt the circuit to prevent overshooting of the corrective action, it has been found necessary to further control the operation of the secondary relay so that its repeated circuit closing operation is a function of time following the interruption of the circuit. In my Patents 2,140,363 and 2,121,601, assigned to the assignee of this invention, there are disclosed representative regulating circuits which embody such regulators.

In my Patent 2,121,601, a plurality of capacitors is utilized for effecting a time delay to insure a corrective operation of the rheostatic pilot motor after such corrective action is initiated. One of the capacitors is employed in the energizing circuit of the secondary relay to insure a slow return of its contact members to a normal stationary position and is disposed to be shunted from the energizing circuit to effect an abrupt movement of the secondary relay contact members. This capacitor aids in obtaining antihunt operation but the charge of the capacitor when shunted from the secondary relay energizing circuit is wasted. Another capacitor is employed for obtaining a positive delay in the interruption of the motor operated corrective action and in the deenergization of the secondary relay. This latter capacitor is charged only when the contact members of the primary and secondary relays are in engagement the large charging current flowing through the contact members with accompanying arcing and contact wear as the contact members are engaged. The capacitors employed, because of the capacity and voltage requirements of the circuit, are large and heavy, and add greatly to the initial cost of the system as well as to the maintenance cost because of the accompanying contact wear.

It is an object of this invention to provide a regulating system having a sensitive, economical, antihunting means for varying the duration of a corrective action and to insure the operation of the corrective action once it is initiated.

A more specific object of this invention is to utilize a single capacitor in a regulating system having an antihunting means for insuring an operation of corrective action once it is initiated and to insure time delay in repeated operations of the antihunt means.

Figure 2:
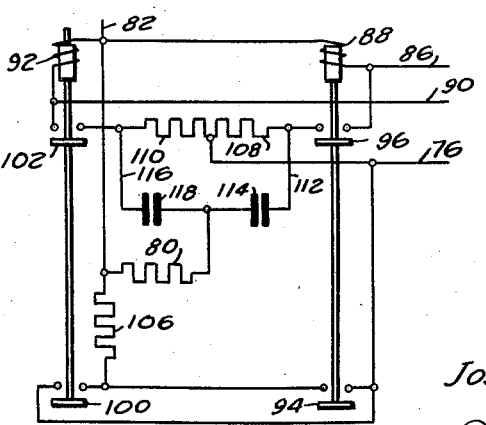

Other objects of this invention will become apparent from the following description when taken in conjunction with the accompanying drawing, in which Figure 1 is a diagrammatic view of circuits and apparatus illustrating a preferred embodiment of this invention, and Figure 2 is a diagrammatic view of a modification of a part of the circuit of Fig. 1.

Referring to Fig. 1 of the drawing, there is illustrated a regulating system of this invention as utilized in maintaining constant the voltage of a generator 10. The generator 10 comprises the armature windings 12 which are directly connected to the conductors 14 of an output circuit and the field winding 16 which is connected to receive exciting current from any suitable source such as the separate exciter 18. In order to adjust the field current for controlling the voltage of the generator 10, a rheostat 20 is connected in the excitation supply circuit disposed to be operated by a motor 22, the operation of which is controlled in a voltage raising and lowering direction by the contactors 24 and 26, respectively.

The motor 22 is provided with an armature winding 28 and field windings 30 and 32 through which circuits may be closed by the contactors 24 and 26, respectively, to supply energy from a suitable constant source of supply such as the supply conductors 34 and 36 in accordance with the operation of a primary relay 38 that is controlled by the voltage between the output conductors 14.

The primary relay 38 comprises a core member 40 having a winding 42 thereon that is connected through the rectifying device 44 to be energized in accordance with the voltage between the conductors 14. An elongated armature member 46 is mounted upon a pivot 48 and biased by an adjustable spring 50 against the magnetic pull of the core member 40 as the winding 42 is energized. As illustrated, the armature member 46 is provided with a pair of offset, spaced but facing contact members 52 and 54 at one end thereof for cooperating with and engaging a pair of offset contact members 56 and 58, respectively, of a secondary relay 60.

The secondary relay 60 also comprises a core member 62 having an energizing winding 64 thereon, and an elongated armature member 66 which carries the contact members 56 and 58 at its outer ends electrically insulated from each other by a block 68 of insulating material. The armature member 66 is mounted upon a pivot 70 and is biased by an adjustable spring 72 against the magnetic pull of the core member 62 as the winding 64 is energized. As illustrated, the armature members 46 and 66 of the primary relay 38 and secondary relay 60, respectively, have only one pivot apiece and are mounted at right angles to each other whereby a simple pivotal movement of either member will effect a contact closing or contact opening operation depending upon the operation of the relays. The use of only one pivot as contrasted to the linkage mechanism of the known structures simplifies maintenance of the system of this invention.

The details and construction of the cooperating primary relay 38 and secondary relay 60 are more fully described in my copending application Serial No. 456,188, filed August 26, 1942, and assigned to the assignee of this invention.

One side of the winding 64 of the secondary relay 60 is connected by conductor 74 to the supply conductor 34 and the other side is connected by conductor 76 through a damper or time delay circuit comprising a capacitor 78, a resistor 80 and conductors 82 and 84 to the opposite supply conductor 36. Each of the contact members 52 and 54 of the primary relay 38 is also connected by conductor 74 to the supply conductor 34, while the contact member 56 of relay 60 is connected by conductor 86 through the energizing winding 88 of contactor 24 and conductors 82 and 84 to the supply conductor 36. The contact member 58 of secondary relay 60 is connected by conductor 90 through the energizing winding 92 of contactor 26 and conductors 82 and 84 to the supply conductor 36.

As illustrated, the contactors 24 and 26 are provided with contact members 94, 96, 98 and 100, 102, 104, respectively, for establishing predetermined circuits when their respective energizing windings are energized by operation of the primary relay 38. Each of the contact members 94 and 100 of the contactors 24 and 26, respectively, are disposed to shunt the capacitor 78 by connecting the conductor 76 from the winding 64 of relay 60 through a resistor 106 and conductors 82 and 84 to the supply conductor 36. Contact members 96 and 102 of the contactors 24 and 26 respectively are disposed to connect the capacitor 78 through resistors 108 and 110, respectively, to the energizing windings 88 and 92, respectively, of contactors 24 and 26 whereby the discharge of the capacitor will maintain the windings energized. The contact members 98 and 104 of contactors 24 and 26, respectively, function to selectively connect the field windings 30 and 32, respectively, through the conductor 84 to supply conductor 36.

The resistors 108 and 110 may be separate resistors or, as illustrated, one resistor having a center tap. These resistors are utilized to prevent the flow of sneak currents through the energizing windings of the contactors 24 and 26, it being found that without such resistors it is possible under certain conditions to have a circulating current of sufficient intensity to energize the winding of one contactor while the other winding is energized by operation of the primary relay 38 and secondary relay 60 and thereby actuate the contact members 98 and 104 simultaneously to their circuit closing position.

If the system is in operation and the voltage of the generator 10 is at its required value, the energization of the primary relay 38 is sufficient to balance the pull of the adjustable spring 50 and the contact members 52 and 54 are maintained in a given position. Likewise the secondary relay 60 is energized from the supply conductors 34 and 36 sufficiently to balance the pull of the adjustable spring 72 and contact members 56 and 58 are maintained in a predetermined stationary position spaced from the contact members 52 and 54 of the primary relay 38.

If the voltage of the generator 10 increases above its desired value, the energization of the winding 42 increases, thus pulling the armature member 46 in a counterclockwise direction against the pull of the spring 50, as illustrated in the drawing, to a position where the contact member 54 engages the contact member 58 of the secondary relay 60. The engagement of contact members 54 and 58 closes a circuit which extends from supply conductor 34, through conductor 74, contact members 54 and 58, conductor 90, the energizing winding 92 of contactor 26, and conductors 82 and 84 to the other supply conductor 36. The establishing of this circuit energizes the winding of contactor 26 to actuate its contact members 100, 102 and 104 to their circuit closing positions.

When thus actuated, contact member 104 establishes a circuit extending from the supply conductor 34 through the armature 28, and field winding 32 of the motor 22, contact member 104 and conductor 84 to the other supply conductor 36 to so energize the motor 22 as to operate the rheostat 20 to decrease the energization of the field winding 16 to decrease the generator voltage.

At the same time the contact member 100 of contactor 26 closes a circuit to shunt the capacitor 78 and resistor 80 from the energizing circuit of the field winding 64 of the relay 60 so that the energizing circuit is completed from the supply conductor 34 through conductor 74, the energizing winding 64 of the relay 60, conductor 76, contact member 100, resistor 106 and conductors 82 and 84 to the other supply conductor 36. The shunting of the capacitor in this manner from the energizing circuit effects a sudden increase in the energization of the winding 64 to thereby abruptly move the contact member 58 in a clockwise direction about the pivot 70 against the bias of the spring 72 to abruptly separate the contact members 54 and 58 and interrupt the energizing circuit to the winding 92 of the contactor 26.

However, contact member 102 is actuated to its circuit closing position simultaneously with the movement of contact members 100 and 104 so that a circuit is established which extends from the capacitor 78 through resistor 110, contact member 102 and the energizing winding 92 to conductor 82 to so energize the winding 92 of contactor 26 as to maintain the contact member 104 in its circuit closing position and thereby insure a corrective operation of the motor 22. The duration of the energization of the winding 92 under such circumstances will depend upon the characteristics of the capacitor 78.

As soon as the capacitor 78 is discharged to the point where the discharge current is insufficient to maintain the required energization of the winding 92, the contact members of contactor 26 drop to their open circuit position and the capacitor 78 is again connected in the energizing circuit of winding 64 of the relay 60. The flow of charging current through the winding 64 to the capacitor 78 is of such a value and decreases over a period of time that the return of the contact member 58 of relay 60 towards its predetermined stationary position is a gradual return. Thus time delay is effected before the contact member 58 again engages contact member 54, unless the change in voltage of the generator 10 was so great that the corrective action failed to so decrease the voltage that the contact members 54 and 52 of relay 38 returned to their initial position. Of course, if the initial change in the voltage of the generator 10 is large, the armature member 46 is actuated to a position where the contact member 54 is in engagement with the contact member 58 of relay 60 to maintain the contact members in engagement for a period of time sufficient for corrective operation of the motor 22 to so reduce the excitation of the field 16 to a value where the contact members 54 and 58 can be separated by movement of the contact member 58 as the contact member 54 returns towards its initial position.

Similar operation of the system is obtained if the change in voltage of the generator 10 is a decrease in voltage, the spring 50 of relay 38 biasing the armature member 46 in a clockwise direction, as illustrated to a position where the contact member 52 of relay 38 engages contact member 56 of the relay 60. The engagement of the contact members 52 and 56 completes a circuit from the supply conductor 34, through conductor 74, contact members 52 and 56, conductor 86, energizing winding 88 of contactor 24, and conductors 82 and 84 to the other supply conductor 36. When thus energized, the contact members 94, 96 and 98 of contactor 24 are actuated to their circuit closing positions where the contact members 98 establish an energizing circuit for the motor 22 which extends from the supply conductor 34, through the armature 28, field winding 30, contact members 98 and conductor 84 to a supply conductor 36 to effect an operation of the motor 22 to increase the energization of the field winding 16.

Under such circumstances, the contact members 94 and 96 function in the same manner as contact members 100 and 102 of contactor 26, the contact members 94 shunting the capacitor 78 from the energizing circuit of winding 64 of the relay 60 to effect an abrupt separation of the contact members 52 and 56, while the contact member 96 connects the capacitor 78 through the resistor 108 to the energizing winding 88 whereby the discharge current from the capacitor 78 maintains the energization of the contactor 24 when the contact members 52 and 56 are separated to insure a corrective operation of the motor 22 to increase the voltage of the generator.

Referring to Fig. 2 there is illustrated a modification of a part of the circuit shown in Fig. 1. In this embodiment the conductor 76 is connected directly to the center tap of the resistor formed of resistor sections 108 and 110 which are provided for preventing sneak circuits as described hereinbefore with respect to Fig. 1. The other end of resistor section 108 is connected by conductor 112 through a capacitor 114 and resistor 80 to conductor 82. Likewise the other end of resistor section 110 is connected by a conductor 116 through a capacitor 118 and resistor 80 to conductor 82. In this embodiment the capacitors 114 and 118 are each of half the value as capacitor 78 of the circuit of Fig. 1 being connected in parallel circuit relation to each other and in series circuit with resistor 80.

The parallel connected capacitors 114 and 118 function in the same manner as capacitor 78 when the contactors 24 or 26 are selectively energized, the contact members 94 and 100 respectively, selectively shunting the capacitors from the energizing circuit of the secondary relay 60 and contact members 96 and 102 respectively, selectively connecting them in circuit with the energizing windings 88 and 92 to effect a time delay in the operation of contactors 24 and 26 respectively to open circuit positions. Since the capacitors 114 and 118 are in series with the resistor sections 108 and 110 respectively, the charging current is limited by the resistors and a longer time delay in the return of the contact members of the secondary relay 60 to their predetermined stationary position is obtained. By adjusting the resistor sections 108 and 110 it is thus possible to adjust the time delay in the operation of relay 60 to its initial operative position.

The system of this invention is considerably simplified over the known systems and the equipment necessary is greatly reduced. The advantages of utilizing only one capacitor or the smaller parallel connected capacitors for obtaining the time delay or gradual return of the contact members of the secondary relay towards their predetermined stationary position and utilizing the discharge of the same capacitor for time delay to insure a corrective operation of the rheostat motor are readily apparent. Further maintenance of the primary and secondary relays is greatly reduced since the charging current of the capacitor as utilized in this system does not pass through the contact members of the relays. The system is quite sensitive while the apparatus employed is sufficiently rugged to withstand high physical shock.

Although this invention has been described with reference to a particular embodiment thereof, it is, of course, not to be limited thereto except in so far as is necessitated by the scope of the appended claims.

I claim as my invention:

1. In a regulating system, in combination, a primary control relay having contact members disposed for movement under predetermined operating conditions, a secondary control relay having contact members cooperatively related to the contact members of the primary relay, balancing means including an electromagnetic means for positioning the contact members of the secondary relay, an energizing circuit including a capacitor for normally energizing the electromagnetic means to maintain the contact members of the secondary relay in predetermined stationary positions, a control means having a winding disposed to be energized by engagement of the cooperating contact members, the control means also being disposed when energized to shunt the capacitor from the energizing circuit for the electromagnetic means and connect the capacitor in circuit with the winding of the control means, the control means thereby effecting an increase in the energization of the electromagnetic means for abruptly moving the contact members of the secondary relay in a direction away from the contact members of the primary relay while the capacitor maintains the energization of the winding of the control means for a predetermined period of time after the contact members are separated, the capacitor cooperating in the energizing circuit when the winding of the control means is deenergized to effect a gradual decrease in the energization of the electromagnetic means to obtain a gradual return of the contact members of the secondary relay to their predetermined stationary positions.

2. In a regulating system, in combination, a primary control relay having contact members disposed for movement under predetermined operating conditions, contact means cooperatively related thereto, balancing means including an electromagnetic means for positioning the cooperative contact members, an energizing circuit including a capacitor for normally energizing the electromagnetic means to maintain the cooperative contact members in predetermined stationary positions, a control means having a winding disposed to be energized upon the engagement of the cooperating contact members, the control means also being disposed when energized to shunt the capacitor from the energizing circuit for the electromagnetic means and connect the capacitor in circuit with the winding of the control means, the control means thereby effecting an increase in the energization of the electromagnetic means for abruptly moving the cooperative contact members in a direction away from the contact members of the primary relay and simultaneously therewith maintaining the energization of its winding a predetermined period of time after the contact members are separated, the capacitor cooperating in the energizing circuit when the winding of the control means is deenergized to effect a gradual decrease in the energization of the electromagnetic means to obtain a gradual return of the cooperative contact members to their predetermined stationary positions.

3. In a regulating system, in combination, a primary control relay having an armature member and spaced contact members carried thereby disposed for pivotal movement, a secondary control relay having an armature member and spaced contact members cooperatively related to the contact members of the primary relay disposed for pivotal movement at right angles to the pivotal movement of the primary relay armature member, balancing means including an electromagnetic means for positioning the armature member and the contact members of the secondary relay, an energizing circuit including a capacitor for normally energizing the electromagnetic means to maintain the contact members of the secondary relay in predetermined stationary positions, a control means having a winding disposed to be energized by engagement of the cooperating contact members, the control means also being disposed when energized to shunt the capacitor from the energizing circuit for the electromagnetic means and connect the capacitor in circuit with the winding of the control means, the control means thereby effecting an increase in the energization of the electromagnetic means for actuating the armature member of the secondary relay to pivotally move at right angles to the pivotal movement of the armature member of the primary relay to separate the contact members, the capacitor maintaining the energization of the winding of the control means for a predetermined period of time after the contact members are separated, the capacitor also cooperating in the energizing circuit when the winding of the control means is deenergized to effect a gradual decrease in the energization of the electromagnetic means to obtain a gradual return of the contact members of the secondary relay to their predetermined stationary positions.

4. In a regulating system, in combination, a pair of oppositely disposed cooperative contact members, each of the contact members having an electroresponsive means associated therewith, each of the electroresponsive means being disposed to be energized to control the movement of the contact member associated therewith, an energizing circuit disposed to maintain one of the pair of contact members in a predetermined stationary position, said energizing circuit including a pair of capacitors normally connected in parallel circuit relation to each other and in series circuit relation with the electroresponsive means associated with said one of the pair of contact members, a control means having a winding disposed to be energized when the pair of contact members is in engagement, the control means also being disposed to shunt the capacitors from the energizing circuit and to connect them in circuit with the winding of the control means, the control means thereby effecting an increase in the energization of the electroresponsive means associated with said one of the pair of contact members for abruptly effecting a movement thereof away from the other contact member and simultaneously therewith maintain the energization of the winding of the control means for a predetermined period of time after the separation of the contact members, the capacitors cooperating in the energizing circuit when the winding of the control means is deenergized to effect a gradual decrease in the energization of the electroresponsive means associated with said one of the pair of contact members to obtain a gradual return of said one of the contact members to its predetermined stationary position.

5. In a regulating system, in combination, a primary control relay having an armature member and spaced contact members carried thereby disposed for pivotal movement, a secondary control relay having an armature member and spaced contact members cooperatively related to the contact members of the primary relay, the armature member of the secondary control relay being disposed for pivotal movement at right angles to the pivotal movement of the primary relay armature member, balancing means including an electromagnetic means for positioning the armature member and the contact members of the secondary relay, an energizing circuit for normally energizing the electromagnetic means to maintain the contact members of the secondary relay in predetermined stationary positions, said energizing circuit including a pair of capacitors normally connected in parallel circuit relation to each other and in series circuit relation with the electromagnetic means, and a control means having a winding disposed to be energized by engagement of the cooperating contact members, the control means also being disposed to shunt the capacitors from the energizing circuit and to connect them in circuit with the winding of the control means, the control means thereby effecting an increase in the energization of the electromagnetic means for abruptly effecting a movement of the armature member of the secondary relay to pivotally move at right angles to the pivotal movement of the armature member of the primary relay to separate the contact members, the capacitors maintaining the energization of the winding of the control means for a predetermined period of time after the contact members are separated, the capacitors cooperating in the energizing circuit when the winding of the control means is deenergized to effect a gradual decrease in the energization of the electromagnetic means to obtain a gradual return of the contact members of the secondary relay to their predetermined stationary positions.

JOSEPH F. KOVALSKY.